US011072724B2

(12) United States Patent
Goedegebuure et al.

(10) Patent No.: US 11,072,724 B2
(45) Date of Patent: Jul. 27, 2021

(54) ADHESION PROMOTOR FOR REAL MICHAEL ADDITION CROSSLINKABLE COMPOSITIONS

(71) Applicant: ALLNEX NETHERLANDS B.V., Bergen op Zoom (NL)

(72) Inventors: Rien Goedegebuure, Sint-Annaland (NL); Ferry Ludovicus Thys, Stevens-Woluwe (BE); Elwin Aloysius Cornelius Adrianus De Wolf, Hoogerheide (NL); Richard Hendrikus Gerrit Brinkhuis, Zwolle (NL); Michael Anthony Gessner, La Grange, KY (US); Antonius Johannes Wilhelmus Buser, Wehl (NL)

(73) Assignee: Allnex Netherlands B.V., Bergen op Zoom (NL)

( * ) Notice: Subject to any disclaimer, the term of this patent is extended or adjusted under 35 U.S.C. 154(b) by 209 days.

(21) Appl. No.: 15/563,953

(22) PCT Filed: Apr. 18, 2016

(86) PCT No.: PCT/EP2016/058517
§ 371 (c)(1),
(2) Date: Oct. 3, 2017

(87) PCT Pub. No.: WO2016/166365
PCT Pub. Date: Oct. 20, 2016

(65) Prior Publication Data
US 2018/0251656 A1 Sep. 6, 2018

Related U.S. Application Data

(60) Provisional application No. 62/148,966, filed on Apr. 17, 2015.

(30) Foreign Application Priority Data

May 28, 2015 (EP) .................................. 15169717

(51) Int. Cl.
C09D 167/02 (2006.01)
C09D 163/00 (2006.01)
C08J 3/24 (2006.01)
B05D 1/02 (2006.01)
C08L 63/00 (2006.01)
C08L 67/02 (2006.01)
C09D 17/00 (2006.01)
B05D 3/02 (2006.01)
B05D 3/10 (2006.01)
C08G 61/12 (2006.01)

(52) U.S. Cl.
CPC ............ C09D 167/02 (2013.01); B05D 1/02 (2013.01); B05D 3/0254 (2013.01); B05D 3/102 (2013.01); C08J 3/24 (2013.01); C08L 63/00 (2013.01); C08L 67/02 (2013.01); C09D 17/008 (2013.01); C09D 163/00 (2013.01); C08G 61/12 (2013.01); C08G 2261/135 (2013.01); C08G 2261/334 (2013.01); C08J 2367/02 (2013.01); C08L 2205/025 (2013.01)

(58) Field of Classification Search
CPC ... C09D 167/02; C09D 17/008; C09D 163/00
See application file for complete search history.

(56) References Cited

U.S. PATENT DOCUMENTS

| 2,635,100 | A | 4/1953 | Werntz |
| 2,759,913 | A | 8/1956 | Hulse et al. |
| 4,217,396 | A | 8/1980 | Heckles |
| 4,223,072 | A | 9/1980 | Baney et al. |
| 4,408,018 | A | 10/1983 | Bartman et al. |

(Continued)

FOREIGN PATENT DOCUMENTS

| CN | 86101015 A | 8/1986 |
| CN | 1309683 A | 8/2001 |

(Continued)

OTHER PUBLICATIONS

Noomen, Arie: "Applications of Michael addition chemistry in coatings technology", Progress in Organic Coatings, 32 (1997), pp. 137-142.
Lösungen, Römpp online 4.0, Mar. 1, 2002, with English machine translation.
"The Basics of Airless Spraying, Information on Basic Components, Spray Techniques and Safety", Graco, 2014.
Anonymus: "ETPPAAc Solutions Ethyltriphenylphosphonium Acid Acetate", Apr. 20, 2007, pp. 1-2.
Priority search report for EP10159253.3 completed on Mar. 10, 2011.

(Continued)

Primary Examiner — Kelly M Gambetta
(74) Attorney, Agent, or Firm — Hoyng Rokh Monegier B.V.; David P. Owen

(57) ABSTRACT

The invention relates to an adhesion promotor for improving adhesion on a substrate surface of an RMA crosslink able composition comprising one or more crosslinkable components comprising a reactive component A with at least two acidic protons C—H in activated methylene or methine groups, a reactive component B with at least two activated unsaturated C=C groups, a catalyst C for catalyzing the RMA crosslinking reaction between components A and B, said adhesion promotor P comprising a moiety comprising one or more functional groups X or precursors thereof readable with component A or component B and a moiety comprising one or more functional groups Y or precursors thereof that adsorb or react with the substrate surface not being an alkoxysilane group. The invention also relates to a RMA crosslinkable composition, also in the form of a kit of parts, to a premix for use as a part in the kit of parts.

14 Claims, No Drawings

(56) References Cited

U.S. PATENT DOCUMENTS

| | | | |
|---|---|---|---|
| 4,529,487 A | 7/1985 | Hsu et al. |
| 4,602,061 A | 7/1986 | Akkerman |
| 4,749,728 A | 6/1988 | Craun et al. |
| 4,851,294 A | 7/1989 | Buter et al. |
| 4,871,822 A | 10/1989 | Brindöpke et al. |
| 4,938,980 A | 7/1990 | Arciszewski et al. |
| 5,017,649 A | 5/1991 | Clemens |
| 5,084,536 A | 1/1992 | Brindöpke et al. |
| 5,959,028 A | 9/1999 | Brinkhuis |
| 5,973,082 A | 10/1999 | Elmore |
| 5,990,224 A | 11/1999 | Raynolds et al. |
| 6,201,048 B1 | 3/2001 | Raynolds et al. |
| 6,262,169 B1 | 7/2001 | Helmer et al. |
| 6,265,029 B1 | 7/2001 | Lewis |
| 6,608,225 B1 | 8/2003 | Larson et al. |
| 6,706,414 B1 | 3/2004 | Dammann et al. |
| 6,878,845 B2 | 4/2005 | Sheridan |
| 6,989,459 B2 | 1/2006 | Walker |
| 7,524,435 B2 | 4/2009 | Bernard |
| 7,851,530 B2 | 12/2010 | Brinkhuis et al. |
| 8,013,068 B2 | 9/2011 | Beckley et al. |
| 8,124,688 B2 | 2/2012 | Meijer et al. |
| 8,569,440 B2 | 10/2013 | Spyrou et al. |
| 8,829,151 B2 | 9/2014 | Meijer et al. |
| 8,962,725 B2 | 2/2015 | Brinkhuis et al. |
| 9,181,452 B2 | 11/2015 | Brinkhuis |
| 9,181,453 B2 | 11/2015 | Brinkhuis |
| 9,260,626 B2 | 2/2016 | Brinkhuis |
| 9,284,423 B2 | 3/2016 | Brinkhuis |
| 9,534,081 B2 | 1/2017 | Brinkhuis |
| 9,587,138 B2 | 3/2017 | Brinkhuis et al. |
| 9,834,701 B2 | 12/2017 | Brinkhuis et al. |
| 2003/0023108 A1 | 1/2003 | Walker |
| 2003/0195305 A1 | 10/2003 | Kuo et al. |
| 2004/0072979 A1 | 4/2004 | Sheridan et al. |
| 2005/0137275 A1 | 6/2005 | Nefzger et al. |
| 2005/0143575 A1 | 6/2005 | Bernard |
| 2006/0078742 A1 | 4/2006 | Kauffman et al. |
| 2007/0173602 A1 | 7/2007 | Brinkman et al. |
| 2007/0299206 A1 | 12/2007 | Cooper et al. |
| 2009/0143528 A1 | 6/2009 | Mestach et al. |
| 2009/0226729 A1 | 9/2009 | Niimoto et al. |
| 2011/0003937 A1 | 1/2011 | Kontani |
| 2011/0251338 A1 | 10/2011 | Kim et al. |
| 2013/0053505 A1 | 2/2013 | Brinkhuis et al. |
| 2013/0210986 A1 | 8/2013 | Brinkhuis et al. |
| 2013/0317156 A1 | 11/2013 | Yu |
| 2014/0088233 A1 | 3/2014 | Kann |
| 2014/0221542 A1 | 8/2014 | Brinkhuis et al. |
| 2014/0228507 A1 | 8/2014 | Brinkhuis et al. |
| 2016/0115344 A1 | 4/2016 | Brinkhuis et al. |

FOREIGN PATENT DOCUMENTS

| | | |
|---|---|---|
| CN | 1637031 A | 7/2005 |
| CN | 1723242 A | 1/2006 |
| CN | 1757656 A | 4/2006 |
| CN | 1816597 A | 8/2006 |
| CN | 1910234 A | 2/2007 |
| CN | 1964997 A | 5/2007 |
| CN | 1976972 A | 6/2007 |
| CN | 101012291 A | 7/2007 |
| CN | 101012291 A | 8/2007 |
| CN | 101103060 A | 1/2008 |
| CN | 101107289 A | 1/2008 |
| CN | 101213230 A | 7/2008 |
| CN | 101268149 A | 9/2008 |
| CN | 101869844 A | 10/2010 |
| CN | 101879457 A | 11/2010 |
| CN | 102834436 A | 12/2012 |
| CN | 102834437 A | 12/2012 |
| CN | 103562328 A | 2/2014 |
| CN | 103974999 A | 8/2014 |
| DE | 835809 A | 4/1952 |
| DE | 835809 B | 4/1952 |
| DE | 3041223 A1 | 5/1981 |
| EP | 0161697 A1 | 11/1985 |
| EP | 0192304 A1 | 8/1986 |
| EP | 0198519 A1 | 10/1986 |
| EP | 0227454 A2 | 7/1987 |
| EP | 227454A2 A | 7/1987 |
| EP | 0161697 B1 | 3/1988 |
| EP | 0310011 A1 | 9/1988 |
| EP | 0310011 A1 | 4/1989 |
| EP | 0326723 A1 | 8/1989 |
| EP | 0448154 A1 | 9/1991 |
| EP | 0501223 A2 | 9/1992 |
| EP | 0651023 A2 | 5/1995 |
| EP | 0808860 A2 | 11/1997 |
| EP | 1541606 A1 | 12/2004 |
| EP | 1513900 A1 | 3/2005 |
| EP | 1541606 A1 | 6/2005 |
| EP | 1593727 A1 | 11/2005 |
| EP | 1761582 | 1/2006 |
| EP | 1513900 B1 | 2/2006 |
| EP | 1640388 A2 | 3/2006 |
| EP | 1641887 A1 | 4/2006 |
| EP | 1641888 A1 | 4/2006 |
| EP | 1838747 | 7/2006 |
| EP | 1761582 A1 | 3/2007 |
| EP | 1813630 A2 | 8/2007 |
| EP | 1838747 A1 | 10/2007 |
| EP | 1902081 A1 | 3/2008 |
| EP | 2072520 A1 | 6/2009 |
| EP | 1813630 B1 | 3/2010 |
| EP | 2374836 A1 | 4/2010 |
| EP | 1641887 B1 | 10/2010 |
| EP | 1902081 B1 | 12/2010 |
| EP | 2374836 A1 | 10/2011 |
| EP | 1641888 B1 | 2/2012 |
| EP | 2556108 A1 | 2/2013 |
| EP | 2556108 B1 | 7/2014 |
| EP | 2764035 A1 | 8/2014 |
| EP | 3085748 A1 | 10/2016 |
| GB | 2010879 A | 7/1979 |
| GB | 1596638 A | 8/1981 |
| GB | 2093472 A | 9/1982 |
| GB | 2010879 A | 7/1997 |
| GB | 2405149 A | 2/2005 |
| JP | 53141369 A | 12/1978 |
| JP | 62-223204 A | 10/1987 |
| JP | 01204919 A | 8/1989 |
| JP | H01204919 A | 8/1989 |
| JP | 8501124 A | 2/1996 |
| JP | 8319437 A | 12/1996 |
| JP | 1045993 A | 2/1998 |
| JP | H1045993 A | 2/1998 |
| JP | 10330690 A | 12/1998 |
| JP | H10330690 A | 12/1998 |
| JP | 2000119353 A | 4/2000 |
| JP | 2001505948 A | 5/2001 |
| JP | 2001-207631 A | 8/2001 |
| JP | 2001516787 A | 10/2001 |
| JP | 2001516789 A | 10/2001 |
| JP | 2002514673 A | 5/2002 |
| JP | 2002285100 | 10/2002 |
| JP | 2002285100 A | 10/2002 |
| JP | 2003522817 A | 7/2003 |
| JP | 200418859 A | 1/2004 |
| JP | 2004018859 A | 1/2004 |
| JP | 2004211090 A | 7/2004 |
| JP | 2005-034687 A | 2/2005 |
| JP | 2005-505653 A | 2/2005 |
| JP | 2006-089743 A | 4/2006 |
| JP | 2006525402 A | 11/2006 |
| JP | 2011-099744 A | 5/2011 |
| JP | 2011-208371 A | 10/2011 |
| JP | 2013-091982 A | 5/2013 |
| JP | 2013-108339 A | 6/2013 |
| JP | 2013528670 A | 7/2013 |
| JP | 2014533948 A | 12/2014 |
| JP | 2015120769 A | 7/2015 |
| JP | 5910952 B2 | 4/2016 |
| KR | 100232793 B1 | 12/1999 |

(56) References Cited

FOREIGN PATENT DOCUMENTS

| | | |
|---|---|---|
| NL | 8203502 A | 4/1984 |
| RU | 2275403 C2 | 4/2006 |
| RU | 2346016 C2 | 2/2009 |
| RU | 2415167 C2 | 3/2011 |
| RU | 2484113 C2 | 6/2013 |
| RU | 2532909 C2 | 11/2014 |
| SG | 11201401321 W | 4/2013 |
| SG | 11201401321 A | 8/2014 |
| TW | 200613500 A | 5/2006 |
| WO | 94017148 A | 8/1994 |
| WO | 9641833 A1 | 12/1996 |
| WO | 9825989 A1 | 6/1998 |
| WO | 9914275 A1 | 3/1999 |
| WO | 9914278 A1 | 3/1999 |
| WO | 9914279 A1 | 3/1999 |
| WO | 9958608 A1 | 11/1999 |
| WO | 0004106 A1 | 1/2000 |
| WO | 0112708 A1 | 2/2001 |
| WO | 02053613 A1 | 7/2002 |
| WO | 2003031502 A | 4/2003 |
| WO | 03089479 A2 | 10/2003 |
| WO | 2004035632 A2 | 4/2004 |
| WO | 2004099329 A1 | 11/2004 |
| WO | 2005021672 A1 | 3/2005 |
| WO | 2005048866 A2 | 6/2005 |
| WO | 2005104694 A1 | 11/2005 |
| WO | 2005104694 A2 | 11/2005 |
| WO | 2006003044 A1 | 1/2006 |
| WO | 2006074895 A1 | 7/2006 |
| WO | 2006075000 A1 | 7/2006 |
| WO | 2006081079 A1 | 8/2006 |
| WO | 2007000335 A1 | 1/2007 |
| WO | 2007002328 A1 | 1/2007 |
| WO | 2007035255 A1 | 3/2007 |
| WO | 2008070022 A1 | 6/2008 |
| WO | 2008157468 A1 | 12/2008 |
| WO | 2011124663 A1 | 10/2011 |
| WO | 2011124664 A1 | 10/2011 |
| WO | 2011124665 A1 | 10/2011 |
| WO | 2012002095 A | 1/2012 |
| WO | 2012175622 A1 | 12/2012 |
| WO | 2013050574 A1 | 4/2013 |
| WO | 2013050622 A1 | 4/2013 |
| WO | 2013050623 A1 | 4/2013 |
| WO | 2013050624 A1 | 4/2013 |
| WO | WO-2013050624 A1 * | 4/2013 |
| WO | 2013071012 A2 | 5/2013 |
| WO | 2014125589 A | 8/2014 |
| WO | 2005021672 A1 | 10/2014 |
| WO | 2014166880 A1 | 10/2014 |
| WO | 2016054367 A1 | 4/2016 |
| WO | 2016166334 A1 | 10/2016 |
| WO | 2016166361 A1 | 10/2016 |
| WO | 2016166365 A1 | 10/2016 |
| WO | 2016166369 A1 | 10/2016 |
| WO | 2016166371 A1 | 10/2016 |
| WO | 2016166381 A1 | 10/2016 |
| WO | 2016166382 A1 | 10/2016 |
| WO | 2019145472 A1 | 8/2019 |

OTHER PUBLICATIONS

International Search Report and Written Opinion for PCT/EP2011/055463 dated May 30, 2011 and International Preliminary Report on Patentability (Ch. II) for PCT/EP2011/055463 completed on Jun. 25, 2012.
International Search Report and Written Opinion for PCT/EP2011/055464 dated Jun. 7, 2011 and International Preliminary Report on Patentability (Ch. II) for PCT/EP2011/055464 completed on Jun. 18, 2012.
International Search Report and Written Opinion for PCT/EP2011/055465 dated May 10, 2011 and International Preliminary Report on Patentability (Ch. II) for PCT/EP2011/055465 completed Jun. 18, 2012.
Priority search report for EP11184388.4 completed on Jul. 26, 2012, International Search Report and Written Opinion for PCT/EP2012/069798 dated Jan. 16, 2013 and International Preliminary Report on Patentability (Ch. I) for PCT/EP2012/069798 dated Apr. 8, 2014.
Priority search report for EP11184439.5 completed on Aug. 9, 2012. International Search Report and Written Opinion for PCT/EP2012/069906 dated Dec. 10, 2012 and International Preliminary Report on Patentability (Ch. I) for PCT/EP2012/069906 dated Apr. 8, 2014.
International Search Report and Written Opinion for PCT/EP2012/069904 dated Jan. 15, 2013 and International Preliminary Report on Patentability (Ch. I) for PCT/EP2012/069904 dated Apr. 8, 2014.
Priority search report for EP11184426.2 completed on Aug. 9, 2012, International Search Report and Written Opinion for PCT/EP2012/069905 dated Jan. 15, 2013 and International Preliminary Report on Patentability (Ch. II) for PCT/EP2012/069905 completed on Dec. 10, 2013.
Priority search report for EP13162819.0 completed on Feb. 19, 2014, International Search Report and Written Opinion for PCT/EP2014/056953 dated May 2, 2014 and International Preliminary Report on Patentability (Ch. I) for PCT/EP2014/056953 dated Oct. 13, 2015.
Priority search report for NL2014666 completed on Mar. 10, 2016, International Search Report and Written Opinion for PCT/EP2016/058427 dated Jul. 7, 2016 and International Preliminary Report on Patentability (Ch. I) for PCT/EP2016/058427 dated Oct. 17, 2017.
Priority search report for EP15169717.4 completed on Nov. 17, 2015.
International Search Report and Written Opinion for PCT/EP2016/058517 dated Aug. 1, 2016 and International Preliminary Report on Patentability (Ch. I) for PCT/EP2016/058517 dated Oct. 17, 2017.
International Search Report and Written Opinion for PCT/EP2016/058525 dated Jul. 13, 2016 and International Preliminary Report on Patentability (Ch. I) for PCT/EP2016/058525 dated Oct. 17, 2017.
International Search Report and Written Opinion for PCT/EP2016/058540 dated Jul. 18, 2016 and International Preliminary Report on Patentability (Ch. I) for PCT/EP2016/058540 dated Oct. 17, 2017.
Search report for NL2014667 completed on Feb. 11, 2016, with English machine translation.
Priority search report for EP15169719.0 completed on Nov. 3, 2015.
International Search Report and Written Opinion for PCT/EP2016/058588 dated Jul. 12, 2016 and International Preliminary Report on Patentability (Ch. I) for PCT/EP2016/058588 dated Oct. 17, 2017.
International Search Report and Written Opinion for PCT/EP2016/058590 dated Jul. 25, 2016 and International Preliminary Report on Patentability (Ch. I) for PCT/EP2016/058590 dated Oct. 17, 2017.
Priority search report for EP15169722.4 completed on Aug. 19, 2015 and International Search Report and Written Opinion for PCT/EP2016/058483 dated Jun. 9, 2016 and International Preliminary Report on Patentability Ch. I) for PCT/EP2016/058483 dated Oct. 17, 2017.
Search report for NL2014668 completed on Feb. 11, 2016, with English machine translation.
U.S. Appl. No. 14/989,961 (now U.S. Pat. No. 9,587,138) filed Jan. 7, 2016 (parent filing date Apr. 7, 2014).
JP Application No. 2014-533948 filed on Mar. 28, 2014 (effective filing date Oct. 8, 2012).
T. Jung et al.—Farbe and Lacke Oct. 2003.
The International Search Report of PCT/EP2012/069904.
Braun, D. et al., Polymer Synthesis: Theory and Practice, 4th ed., 2005, pp. 64-66.
Noomen, Arie: "Applications of Michael addition chemistry in coatings technology", Progress in Organic Coatings, 32 pp. 137-142. (1997).
Krishnadas, Shashikiran et al., "Rapid Setting Epoxy Primer System with the Addition of Blocked Catalyst", Indian Journal of Advances in Chemical Science 2 (2014), pp. 55-60.
Lösungen, Römpp online 4.0, Mar. 1, 2002.
"The Basics of Airless Spraying, Information on Basic Components, Spray Techniques and Safety", 2014.
"ETPPAAc Solutions Ethyltriphenylphosphonium Acid Acetate", Apr. 20, 2007, pp. 1-2.

(56) References Cited

OTHER PUBLICATIONS

Brinkhuis, R.; Schutyser, J.; Thys, F.; De Wolf, E.; Buser, T.; Kalis, J.; Magnus, N.; Van Wijk, F. Taming the Michael Addition Reaction. European Coatings Journal 2015, 34-40. (Year: 2015).
Azo Materials, "A_Guide_to_Silane_Solutions_Adhesives", Sep. 7, 2012, Internet Article, https://www.azom.com/article.aspx?ArticleID=6777.

* cited by examiner

ADHESION PROMOTOR FOR REAL MICHAEL ADDITION CROSSLINKABLE COMPOSITIONS

CROSS REFERENCE TO RELATED APPLICATIONS

This application is a 371 of PCT application number PCT/EP2016/058517 filed on Apr. 18, 2016, which claims priority from EP application number 15169717.4 filed on May 28, 2015, and U.S. application No. 62/148,966 filed on Apr. 17, 2015. All applications are hereby incorporated by reference in their entireties.

The invention relates generally to an adhesion promotor P for improving adhesion on a substrate surface of an RMA crosslinkable coating composition, to the use thereof in RMA crosslinkable compositions, in particular coating compositions, and to RMA crosslinkable compositions and kit of parts thereof more in particular pigmented coating compositions (paints) with improved adhesion to substrates.

RMA crosslinkable compositions are compositions comprising at least one crosslinkable component comprising reactive components A and B each comprising at least 2 reactive groups wherein the at least 2 reactive groups of component A are acidic protons (C—H) in activated methylene or methine groups (RMA donor group), and the at least 2 reactive groups of component B are activated unsaturated groups (C═C) (RMA acceptor group). These reactive groups react to achieve crosslinking by Real Michael Addition (RMA) reaction between said at least one crosslinkable components in the presence of a base catalyst (C).

Such RMA crosslinkable compositions are described in EP2556108. Herein a special catalyst C is described which is a substituted carbonate catalyst which decomposes in a coating layer to generate carbon dioxide which evaporates from the applied curing coating layer and a strong base which starts the RMA crosslinking reaction. The catalyst provides long pot-life and at the same time a high reactivity when applied as a coating layer where CO2 can escape.

The problem underlying the invention is that the RMA crosslinkable compositions may show undesirably poor adhesion properties in particular to polar surfaces for example in direct to metal applications. To achieve adhesion the metal surface had to be pretreated with a primer layer or with known metal pretreatments like silane treatment.

In the General Industrial, Marine, Protective, and ACE markets, topcoats are usually applied over an epoxy-amine primer. Adhesion studies of coatings based on RMA crosslinkable compositions were carried out over many different types of commercially available epoxy primers used in a wide field of end use applications including general industry, ACE and protective coatings. However, known epoxy primers do not always give good adhesions results for coatings based on RMA crosslinkable compositions.

Therefore the desire remains to more adequately improve the adhesion of RMA crosslinkable compositions, in particular coating compositions, in particular in pigmented coating compositions comprising the crosslinkable composition as the binder system for the coating and there is a need for adhesion promotors for improving the adhesion of RMA crosslinkable compositions.

BRIEF SUMMARY OF THE INVENTION

According to the invention this problem has been solved by an adhesion promotor P for improving adhesion on a substrate surface of an RMA crosslinkable coating composition comprising one or more crosslinkable components comprising a reactive component A with at least two acidic protons C—H in activated methylene or methine groups, a reactive component B with at least two activated unsaturated C═C groups, a catalyst C for catalyzing the RMA crosslinking reaction between components A and B, optionally a reactivity moderator D and optionally an organic solvent T, said adhesion promotor P comprising a moiety comprising one or more functional groups X or precursors thereof reactable with component A or component B and a moiety comprising one or more functional groups Y or precursors thereof that adsorb or react with the substrate surface not being an alkoxysilane group.

It was found that the adhesion promotor P is an effective adhesion promoter in RMA crosslinkable compositions even for direct to metal applications. The functional group X reactable with component A or component B is chemically bonded to the RMA crosslinked network and the functional group Y adsorb or react to provide chemical or physical bond with the substrate surface.

In a preferred embodiment functional group Y adsorbs on the substrate surface and does not react to form a covalent bond. Adsorption is by physical bonds which can be for example hydrogen bonds, ionic or dipolar interactions.

Functional groups X or Y or both can be pending from a molecule or can be moieties within a molecule for example within a heterocyclic compound. A moiety may comprise more than one functional groups X which are close together and spatially separate from the moiety comprising the one or more functional groups Y.

In view of the use in a preferred RMA crosslinkable composition comprising a crosslinkable component with component A being predominantly a malonate or an acetoacetate and a crosslinkable component with component B being an acryloyl, the one or more functional groups X are preferably reactable with malonate or acetoacetate and/or with acryloyl.

The one or more functional groups X reactable with component A or component B of the RMA crosslinkable components are preferably primary or secondary amine, thiol, isocyanate, epoxy, aldehyde, or RMA reactive components A' or B', preferably primary or secondary amine, thiol, or RMA reactive components A' or B'. In case the one or more functional groups X are RMA reactive components A' or B' they can be same or different from the RMA reactive components A and/or B in the crosslinkable components. A' must have activated C—H to react with B and B' must have activated C═C to react with A.

The one or more of the functional groups X can also be in the form of a precursor thereof that is deblockable to form the functional group X during use, preferably a moisture deblockable precursor of X, preferably a moisture deblockable primary or secondary amine, preferably a ketimine, aldimine or oxazolidine. The deblocking can occur with water present in the composition or with moisture on the substrate or from the atmosphere. An advantage of using deblockable precursor of X can be the storage stability, in particular in combination with other RMA composition components.

The one or more functional groups Y preferably are a heterocyclic group, preferably, a nitrogen containing heterocyclic group, or a polar functional group.

Suitable nitrogen containing heterocyclic groups are for example described in PCT/EP2012/069905 as aza-acidic compounds comprising a molecule containing the N—H as part of a group —(C═O)—NH—(C═O)—, or of a group —NH—(O═S═O)— or a heterocycle in which the nitrogen of the N—H group is contained in a heterocyclic ring, more preferably component D is an imide derivative, preferably an (optionally substituted) succinimide or glutarimide. Other suitable components D are hydantoin derivatives, for example 5,5-dimethylhydantoin, sulfonamides, for example aromatic sulfonamides as benzene- or toluenesulfonamide or heterocyclic compounds, for example triazoles or a pyrazoles, or a uracil derivative.

The heterocyclic group is preferably selected from the group of pyridine, imidazole, cyclic amide, pyrrolidone, morpholine, triazole, benzotriazole or cyclic urea. Good results were obtained with imidazole, triazole or benzotriazole.

It was found that heterocyclic groups show good adsorption and adhesion to substrate, in particular metal, surfaces. The polar functional group are preferably selected from the group of alcohol, diol, triol, amide and urea or substituted urea. Good results were obtained with 1-(3-aminopropyl) imidazole, 3-(aminomethyl) pyridine, 4-(2-aminoethyl) morpholine and aminoethyl-1,3-propanediol as described in the examples as illustration of heterocyclic and polar groups Y.

A preferred adhesion promotor has a moiety comprising one or more functional groups X being primary or secondary amine, thiol, isocyanate, epoxy, aldehyde, or RMA reactive components A' or B', optionally connected to the moiety comprising functional groups Y over a bridging group R, wherein the one or more functional groups Y comprise a heterocyclic functional group or a polar functional group.

Adhesion promotor wherein functional groups X is a component A' or B' can be produced by forming an adduct of an adhesion promotor having a moiety comprising one or more functional groups X being primary or secondary amine, thiol, isocyanate. aldehyde or epoxy, preferably primary or secondary amine, and reacting X with a component A' or B' so that A' or B' become the functional group X in the adhesion promotor P.

In this reaction product the A' must have activated C—H to react with component B on the crosslinkable component and B' must have activated C=C to react with component A on the crosslinkable component. So in case X reacts with C=C in component B', said component B' must be polyfunctional and the amount of X should be chosen to leave C=C functionality in the adhesion promotor. The same applies to the adduct formation of component A'.

The reaction can be done outside the RMA coating composition and the obtained reaction product be added as a separate component as adhesion promotor to an RMA crosslinkable composition.

In one embodiment, the one or more functional groups X are a polyfunctional reactive component B' and one or more functional groups Y are a heterocyclic functional group or polar functional group, preferably a heterocyclic functional group, more preferably a nitrogen containing heterocyclic functional group, most preferably the adhesion promotor is a reaction product of a polyacryloyl, preferably a tri- or tetra-acryloyl with imidazole, triazole or benzotriazole.

Alternatively in the adhesion promotor one or more functional groups X are a polyfunctional reactive component A' and one or more functional groups Y are a heterocyclic functional group or polar functional group. The adhesion promotor can be a reaction product of an adhesion promotor P wherein functional group X is an amine and a polyfunctional acetoacetate group containing reactive component A', said reaction product comprising a reactive component A' as functional group X bonded over an enamine bond to adhesion promoter P. Good results were obtained with an adhesion promotor being the reaction product of polyfunctional acetoacetate, preferably trifunctional acetoacetate, with amino functional adhesion promotors, for example aminomethylpyridine or aminoethylethyleneurea.

The advantage of ex-situ converting an amine in adhesion promotor P by reaction with either component A' or B' is that the amine bond is no longer reactive in the RMA crosslinkable composition as prepared and cannot disturb the curing reaction kinetics. An improvement in curing speed and hardness development can be obtained.

In the adhesion promotor the one or more functional groups Y can also be precursors of functional groups Y, preferably moisture deblockable precursors, in particular oxazolidines as precursor for hyxroxy groups, isocyanate as precursor for urea and ketals, acetal, orthoesters or epoxy as precursors for diols.

The adhesion promotor that can be added to the RMA crosslinkable composition can also be heterocyclic compounds wherein functional group Y and a functional group X are a moiety within the heterocyclic compound and which functional group X is reactive with reactive component A or B, preferably B, of the crosslinkable components at curing conditions of the RMA coating composition to in-situ form during the application and/or curing an adhesive component A-Y or B-Y, preferably B-Y.

The invention also relates to the use of the adhesion promotors described above for improving adhesion on a substrate surface of a RMA crosslinkable coating composition comprising one or more crosslinkable components comprising a reactive component A with at least two acidic protons C—H in activated methylene or methine groups, a reactive component B with at least two activated unsaturated C=C groups, a catalyst C for catalyzing the RMA crosslinking reaction between components A and B, optionally a reactivity moderator D and optionally an organic solvent T.

The invention further relates to the use of triazoles, benzotriazoles or imidazoles as an adhesion promotor for improving adhesion on a substrate surface of a RMA crosslinkable coating composition. These compounds are known in the prior art as reactivity moderators D. It was not known however that these compounds, as opposed to other compounds D, improve the adhesion. They can be used alone or in combination with other adhesion promotors P.

The invention further relates to an RMA crosslinkable composition comprising:
a) Crosslinkable components comprising reactive component A with at least two acidic protons C—H in activated methylene or methine groups (the RMA donor group), preferably predominantly malonate or acetoacetate,
b) Crosslinkable components comprising reactive component B with at least two activated unsaturated groups (the RMA acceptor group), preferably predominantly acryloyl or maleate,
c) a catalyst C, capable of activating the RMA reaction between reactive component A and B, preferably a carbon dioxide blocked strong base catalyst,
d) one or more adhesion promotors described above
e) optionally a reactivity moderator component D
f) optionally an organic solvent or a mixture of organic solvents, more preferably reactive solvent,
g) optionally pigments,
h) optionally water, preferably less than 5, 2 or 1 wt % on total composition weight.

Preferably the crosslinkable composition also comprises a reactivity moderator component D which is an X—H group containing component that is also a Michael addition donor reactable with component B under the action of catalyst C, wherein X is N, P, S or wherein X is C as part of an acidic methyl (CH3) group. It is preferred that component A is predominantly a malonate or acetoacetate, preferably malonate, and the X—H group of component D has a higher acidity than the C—H groups in component A, being characterized in that component D has a pKa (defined in aqueous environment) of at least one unit less than that of the C—H groups in component A.

The RMA crosslinkable composition preferably has a weight amount of adhesion promotor P, which in case of an adduct of an adhesion promotor P with said reactive components A' or B' does not include the weight of reactive components A' or B', between 0.1 and 10 wt % relative to the total weight of the crosslinkable components, preferably 0.2-5, more preferably 0.5-4 and most preferably 1-2 wt %.

In the RMA crosslinkable composition it is preferred that the molar ratio of C═C to C═C reactive groups including C—H in A, functional groups X in adhesion promotor P and groups X—H in D is between 0.3 and 3, preferably 0.5-2 and even more preferably 0.75-1.5.

The RMA crosslinkable composition as described is highly reactive and crosslinks with a short time. Therefore the RMA crosslinkable composition is delivered in the form of a kit of parts comprising two or more parts comprising one or more of the components A, B, C and optional components D and T, wherein
a) at least one part comprising catalyst C but not both A and B and in view of the catalyst stability, certainly in case of the preferred CO2 blocked strong base catalyst, preferably no A or B,
b) at least one part not comprising catalyst C and one or more of components A, B, C or optional components D, T or further coating additives,
c) wherein one or more of the parts of the kit comprise one or more of the adhesion promotors P.

The invention also relates to a premix for use as one of the parts in the kit of parts of the RMA crosslinkable composition said premix comprising catalyst C, substantially no A or B, T and one or more of the adhesion promotors P and optionally D, preferably only C, T and P. It was found that this premix has a good shelf life (storage stability). Surprisingly viscosity shelf stability problems of adhesion promotor P, occurring in some cases, could be overcome by including them in the catalyst pack where it was found to be stable, also in terms of adhesion impact.

The invention also relates to a method for applying a RMA crosslinked coating with improved adhesion on a substrate surface comprising
a. Preparing an RMA crosslinkable composition by mixing shortly before application, preferably within less than 10 hrs or 5 hrs before application, all parts of the kit of parts of claim 23, and optionally further coating additives,
b. applying the RMA crosslinkable composition on the substrate surface, which may optionally be provided with a primer layer, and
c. curing the RMA crosslinkable composition.

Preferably the substrate is metal. The method is particularly useful for improving adhesion direct to metal, wherein the metal surface may be chemically treated and modified but not coated with a primer layer comprising a polymer binder.

The RMA crosslinkable composition can be used for different applications including coatings, adhesives, inks, synthetic resin flooring or binder in structural composites, but preferably is a coating composition (i.e. a lacquer or paint) optionally comprising further usual coating additives as may required for the envisaged application.

Reference is made to EP2556108 and EP2764035 for detailed description of all components in the RMA crosslinkable composition A, B C or D, their preparation, the amounts used in the RMA crosslinkable composition as well as for measurement methods and definitions and the description thereof is hereby incorporated by reference and applicable unless described otherwise herein. Most important features are described below in summary.

It is preferred that reactive component A is malonate or acetoacetate, preferably dominantly malonate, and reactive component B is acryloyl. It is preferred that the one or more reactive components A in the crosslinkable component predominantly comprise one type of reactive components, predominantly meaning preferably more than 50, 75, 90 and most preferably 100% of the C—H reactive groups in crosslinkable component A are from one type of reactive component A, preferably from malonate or acetoacetate and most preferably consisting predominantly of malonate and acetoacetate or acetylacetone as the remainder component A. The most preferred component B is an acryloyl.

The RMA reactive groups are activated C—H and C═C groups (donor and acceptor respectively) which are present in reactive components A and B respectively (for example a malonate and an acryloyl) which reactive components A and B are the building blocks of crosslinkable components. Reactive component A having 2 C—H groups can be used as such. A and B can be on an oligomer or a polymer, can be on separate molecules or both on one molecule.

The reactive components A and/or B are preferably build into a polymer chain or pending or terminal pending on a polymer chain. Preferably, the one or more crosslinkable components are one or more polymers chosen from the group of polyesters, alkyds, polyurethanes, polyacrylates, epoxy resins, polyamides and polyvinyl resins which contain components A or B in the main chain, pendant, terminal or combinations thereof.

The one or more RMA crosslinkable components can be monomeric but preferably at least one crosslinkable component is a polymeric component with a weight average molecular weight Mw of at least 250 gr/mol, preferably a polymer having Mw between 250, 300 and 5000, more preferably between 400 and 4000 or 500 and 3000 gr/mol (as determined by GPC).

The relative amounts of the crosslinkable components in the RMA crosslinkable composition are chosen such that the molar ratio of activated unsaturated reactive group C═C in reactive component B to the activated acidic reactive groups C—H in reactive component A is between 0.5 and 2 and preferably between 0.75-1.5 or 0.8-1.2.

In case components D or P or both are present that comprise reactive groups X—H and can react with B, the molar ratio of activated unsaturated reactive group C═C in reactive component B to the total number of reactive groups C—H in reactive component A and reactive groups X—H in component D and functional group X in P is between 0.3 and 3, preferably 0.5-2 and even more preferably 0.75-1.5 or 0.8-1.2.

In case a reactive solvent is present having 2 C—H reactive groups (for example malonate) then these are also included in the total amount of C—H in the above ratio as they are crosslinkable components. The total amount of monofunctional material should be limited, otherwise it will negatively affect coating properties. Preferably the total amount monofunctional reactive solvent is less than 10, preferably less than 5, 3 or even 2 wt %.

The RMA crosslinkable composition preferably further comprises a reactivity moderator D comprising an X—H group that is also a Michael addition donor reactable with component B under the action of catalyst C, wherein X is C, N, P, O or S or an alcohol with 2 to 12 carbon atoms or both for improving potlife and/or open time.

The X—H group in component D, preferably an N—H group containing component, has a pKa (defined in aqueous environment) of at least one unit, preferably two units, less than that of the C—H groups in predominant component A, preferably the pKa of the X—H group in component D is lower than 13, preferable lower than 12, more preferably lower than 11, most preferably lower than 10; it is preferably higher than 7, more preferably 8, more preferably higher than 8.5.

The component D preferably comprises a molecule containing the N—H as part of a group —(C=O)—NH—(C=O)—, or of a group —NH—(O=S=O)— or a heterocycle in which the nitrogen of the N—H group is contained in a heterocyclic ring preferably chosen from the group of a substituted or unsubstituted succinimide, glutarimide, hydantoin, triazole, pyrazole, imidazole or uracil, preferably chosen from the group of succinimides, benzotriazoles and triazoles.

The component D is present in an amount between 0.1 and 10 wt %, preferably 0.2 and 7 wt %, 0.2 and 5 wt %, 0.2 and 3 wt %, more preferably 0.5 and 2 wt % relative to the total amount of the crosslinkable components A or B and component D. The component D is present in such amount that the amount of X—H groups in component D is no more than 30 mole %, preferably no more than 20, more preferably no more than 10, most preferably no more than 5 mole % relative to C—H donor groups from component A present in the crosslinkable polymer.

The catalyst C can be a carbon dioxide blocked strong base catalyst, preferably a quaternary alkyl ammonium bi- or alkylcarbonate (as described in EP2556108). As this catalyst generates CO2 it is preferred for use in coating layers with a thickness up to 500, 400, 300, 200 or 150 micrometer.

A homogeneous base catalyst C, which is more suitable for thicker coating layers, is described in EP0326723 which is a catalyst consisting of the combination of a tertiary amine and an epoxide.

A preferred homogeneous catalyst C is a salt of a basic anion X– from an acidic X—H group containing compound wherein X is N, P, O, S or C, and wherein anion X– is a Michael Addition donor reactable with component B and anion X– is characterized by a pKa(C) of the corresponding acid X—H of more than two units lower than the pKa(A) of the majority component A and being lower than 10.5. Details of this catalyst are described in PCT/EP2014/056953, which is hereby incorporated by reference.

Other catalysts C that are especially useful in applications in which there is no large surface available for allowing CO2 to evaporate such as in the case of thick films applications, have been described in WO2014166880A1.

In view of the fact that the RMA crosslinking reaction is base catalyzed, acidic components should not be used in the composition such that the acid base reaction between catalyst C and A and optionally D is not interfered. Preferably the composition is essentially free of acidic components not defined as A, B or D.

The RMA composition may comprise one or more organic solvents T required for dissolving certain components or for adjusting the RMA composition to an appropriate handling viscosity (eg for spraying application). Organic solvents for use in RMA crosslinkable compositions are common coating solvents that do not contain acid impurities like alkylacetate (preferably butyl or hexyl acetate), alcohol (preferably C2-C6 alcohol), N alkylpyrrolidine, glycolether, Di-propylene Glycol Methyl Ether, Dipropylene Glycol Methyl Ether, Propylene Glycol Methyl Ether Acetate, ketones etc.

The amount of volatile solvent can be between 0 and 60, 50 or 40 wt % but in view of QESH preferably the composition has a low volatile organic compounds (VOC) content and therefore the amount of volatile organic solvent is preferably less than 30, 25, 20, 15, 10, 5 and most preferably less than 2 or even 1 wt % relative to the total of the crosslinkable components A and B.

In particular where a low viscosity and a low VOC is required it is preferred that the RMA crosslinkable composition comprises one or more reactive solvents which react with crosslinkable components A or B. The one or more reactive solvents are preferably selected from the group of monomeric or dimeric components A, monomeric or dimeric components B, compounds A' having only 1 or 2 reactive acidic protons (C—H) in activated methylene or methine groups, compounds B' having only 1 reactive unsaturated groups (C=C), most preferably alkylacetoacetates, dialkylmalonates, mono- or diacrylates. The total amount of volatile organic solvent plus reactive solvents is between 0 and 30 wt % and the volatile organic solvent is less than 5 wt % relative to the total weight of the RMA composition.

EXAMPLES

The following is a description of certain embodiments of the invention, given by way of example only.

Abbreviations of adhesion promoters used in the examples are given in Table 1:

TABLE 1

| Abbreviations | | |
|---|---|---|
| API | 1-(3-aminopropyl) imidazole: | |
| AMP | 3-(aminomethyl)pyridine | (=3-picolylamine) |
| MoEA | 4-(2-aminoethyl)morpholine: | |
| AEPD: | aminoethyl-1,3-propanediol | |

Adhesion Test:

The results of adhesion stated in the following examples are based on the cross cut adhesion test following the ISO/DIN 2409, ASTM D3359 protocol. The ranking is briefly summarized as follows:

0: The edges of the cuts are completely smooth; none of the squares of the lattice is detached.

1: Detachment of small flakes of the coating at the intersection of the cuts. A cross-cut area not significantly greater than 5% is affected.

2: The coating has flaked along the edges and/or at the intersection of the cuts. A cross-cut area significantly greater than 5%, but not significantly greater than 15% is affected.

3: The coating has flaked along the edges partly or wholly in large ribbons, and/or it has flaked partly or wholly on different parts of the squares. A cross-cut area significantly greater than 15%, but not significantly greater than 35%, is affected.

4: The coating has flaked along the edges of the cuts in large ribbons and/or same squares have detached partly or wholly. A cross-cut area significantly greater than 335%, but not significantly greater than 65% is affected.

5: Any degree of flaking that cannot even be classified by classification 4.

Metal Substrate:

To test the adhesion of given examples and comparative examples films were applied on two types of metal substrates Gardobond 26S 6800 OC and Gardobond C. Gardobond© is a trade name of the German producer "Chemetall". Other examples relate to Q-panel Al-46, an aluminium substrate.

Series 1: Examples and Comparative Examples of Heterocyclic Adhesion Promoters.

In table 2 the results of two types of adhesion promoters are summarized. 1,2,4-Triazole is primarily used as kinetic modifier (also referred to as reactivity moderator D) but it also contributes to adhesion on a steel substrate, in this case Gardobond 26S. The other adhesion promoters of this table all contain a primary amine group. This amino group can react with part of the acryloyl groups of the mentioned formulation. With FTIR it was proven that the reaction of these amines with acryloyl is completed after 24 hours.

General Procedure for Mixing of the Formulations Used for the Comparative Examples:

A malonate containing polyester as described below (MPE1 in paint A) was mixed with the DiTMPTA and the thinner n-propanol and stirred till a homogenous sample was obtained.

General Procedure for Preparation of Triazole Containing Compositions:

The malonate polyester, DiTMPTA and n-propanol were transferred to a flask with screw cap. After obtaining a homogenous mixture the desired amount of 1,2,4-triazole was added to the flask. The 1,2,4-triazole was dissolved by gentle heating (15 minutes 60° C.) followed by stirring for a couple of hours at ambient temperature. If not all triazole is dissolved this procedure is repeated till all triazole is dissolved in the composition.

General Procedure for Mixing Formulations with all Other Adhesion Promoters

The malonate polyester, DiTMPTA and n-propanol were transferred to a flask and mixed. After obtaining a homogeneous mixture the stated amount of adhesion promoter was added. The solutions were then stirred overnight.

Prior to use all mentioned formulations were activated by adding the stated amount of initiator which is a tetrabutylammonium hydroxide TBAH solution reactively blocked with diethylcarbonate, with a base concentration of 0.928 meq/g solution (see procedure for preparation of initiator solutions). The initiator is also referred to herein as catalyst CAT4.

| Component | Catalyst CAT4 |
| --- | --- |
| Aqueous TBAH (55%) | 100 |
| Diethylcarbonate | 45.1 |
| n-propanol | 181 |

We use different layers of tape to create different spacers for the doctor's blade. This results in a variety of cured film thickness, in the examples beneath a range of 50 to 80 microns. Curing is done at 22° C. and a relatively humidity of 45-65%. The adhesion is tested after 24 hours under these conditions.

TABLE 2 adhesion promotion test with heterocyclic anchor groups Y and triazole

| | example | | | | | comp. Example | |
| --- | --- | --- | --- | --- | --- | --- | --- |
| | 1 | 2 | 3 | 4 | 5 | 1 | 2 |
| Type adhesion promoter | MoEA | AMP | API | 1.2.4-triazole | 1.2.4-triazole | none | none |
| Gram MPE1 | 49.6 | 34 | 89 | 43.5 | 47 | 50.8 | 46.9 |
| gram DiTMPTA | 21.7 | 15.9 | 38.45 | 17.75 | 19.2 | 21.95 | 25.7 |
| grams adhesion promoter | 1.31 | 0.94 | 2.43 | 0.19 | 0.625 | 0 | 0 |
| gram n-propanol | 6.1 | 3.6 | 5.4 | 4.7 | 3.5 | 1.5 | 1.5 |
| Gram CAT4 | 3.12 | 2.19 | 5.59 | 2.58 | 2.79 | 3.5 | 3.26 |
| initial [C=C]/gram solids | 2.78 | 2.93 | 2.78 | 2.78 | 2.78 | 2.78 | 3.25 |
| Adhesion score* (ISO/DIN2409:2003) | 0 | 0 | 0 | 0 | 0 | 5 | 5 |

*Gardobond 26 S 6800 OC, Cured film thickness: 50-80 μm

It can be seen that the adhesion promotors used provide good adhesion, whereas the comparative examples show poor adhesion.

Series 2: Examples and Comparative Examples of the Adhesion Promoter Aminoethyl-1,3-Propanediol.

The way of preparation, applying and testing is the same as outlined above. In this study we used two types of steel.

TABLE 3 results of adhesion promotion test aminoethyl-1,3-propanediol.

| | example | | | comp. Example | |
| --- | --- | --- | --- | --- | --- |
| | 6 | 7 | 8 | 3 | 4 |
| gr. MPE1 | 41.9 | 40.8 | 14.55 | 50.8 | 46.9 |
| gr. DiTMPTA | 20.5 | 20.3 | 7.5 | 21.95 | 25.7 |
| gr AEPD | 0.86 | 1.82 | 0.83 | 0 | 0 |
| gr n-propanol | 4.5 | 5.1 | 1.5 | 1.5 | 1.5 |
| gr CAT4 | 3.13 | 3.14 | 1.02 | 3.5 | 3.26 |
| initial[C=C]/gram solids | 3.13 | 3.14 | 3.14 | 2.78 | 3.25 |
| adhesion (ISO/DIN 2409:2003) On Gardobond 26 S Cured film thickness: | | | | | |
| 50-60 μm | 0 | 0 | 0 | 5 | 5 |
| 60-70 μm | 0 | 0 | 0 | 5 | 5 |
| On Gardobond C | | | | | |
| 60-70 μm | 0 | 0 | 0 | 5 | 5 |
| 70-80 μm | 0 | 0 | 0 | 5 | 5 |
| 90-110 μm | 0 | 0 | 0 | 5 | 5 |

Paint Preparations

Paints A was prepared by mixing the components as described in Table 7 below. Paint A is based on a malonate functional resin MPE1 which is a polyester resin which has been trans-esterified with diethylmalonate. This resin is prepared as follows: Into a reactor provided with a distilling column filed with Raschig rings were brought 382 g of neopentyl glycol, 262.8 g of hexahydrophthalic anhydride and 0.2 g of butyl stannoic acid. The mixture was polymerised at 240° C. under nitrogen to an acid value of 0.2 mg KOH/g. The mixture was cooled down to 130° C. and 355 g of diethylmalonate was added. The reaction mixture was heated to 170° C. and ethanol was removed under reduced pressure. Part the resin was modified (MPE1-S) by addition of succinimide as reactivity moderator; when the viscosity at 100° C. reached 0.5 Pa·s the material was cooled down to 140° and 11.2 grams of solid succinimide were added. This mixture was stirred until all succinimide was dissolved. The resins (MPE1 and MPE1S) were further cooled and diluted with butyl acetate to 85% solids, to yield a material with OH value 16 mg KOH/g, GPC Mn 1750, and a malonate equivalent weight of 350 (active C—H EQW 175)

The succinimide containing resin was mixed with same resin not containing the succinimide and 1,2,4 triazole as adhesion promotor.

TABLE 7 paint A composition

| Component | Paint A |
|---|---|
| MPE1 | 139.4 |
| MPE1S | 192.2 |
| Pigment paste* | 565.5 |
| Pre-dissolve: | |
| 1,2,4-triazole | 4.8 |
| n-propanol | 27.0 |
| Subsequently add | |
| Miramer M410 | 0 |
| Methyl propyl ketone | 0 |
| Byk 310:315 1:4 | 2.8 |
| Tinuvin 292 | 4.6 |

*mix 32.0% of Miramer M410 (DiTMPTA component B) with 65.1% of Kronos 2310 and 2.9% of Disperbyk 163 and grind until the particle size is smaller than 10 μm Catalyst Preparation Examples Catalyst compositions were prepared by mixing components specified in Table 8.

TABLE 8

Catalyst compositions

| Component | Catalyst 1 | Catalyst 4a |
|---|---|---|
| Aqueous TBAH (55%) | 100 | 0 |
| Methanolic TBAH 1M | 0 | 51.18 |
| Diethylcarbonate | 45.1 | 0 |
| Dimethylcarbonate | 0 | 8.6 |
| n-propanol | 181 | 0 |

TBAH is tetrabutyl ammonium hydroxide.

Examples NE2 and NE3; Comparative Example CN1

Clear coats were formulated as indicated below and properly mixed; the malonated polyester (MPE) as described in example MPE1 was used as RMA donor. Then the given amount 3-picolylamine (3-aminomethylpyridine) was added, upon stirring, left for 15 minutes and then activated by adding catalyst CAT4. After 10 minutes, the samples were spray applied onto Bonder (Gardobond 26S 6800 OC, Chemetall) or Q-panel (Al-46) substrates. The adhesion was tested after 24 hour cure at ambient temperature. The cured film thickness of all samples mentioned in the table was 50 to 60 micron. Adhesion testing was done with the crosscut method, a 5 indicating total loss of adhesion, a 0 a perfect pass.

| code | Comp CN1 | NE2 | NE3 |
|---|---|---|---|
| g MPE1 | 90.0 | 90.0 | 90.0 |
| g DTMPTA | 36.7 | 36.7 | 36.7 |
| g 3-AMP | 0.0 | 2.8 | 5.7 |
| g butylacetate | 6.0 | 6.0 | 6.0 |
| g n-propanol | 4.0 | 4.0 | 4.0 |
| g catalyst C | 6.1 | 6.1 | 6.1 |
| wt % (o.s.) 3-AMP | 0.0% | 2.5% | 5.0% |
| adhesion rating | | | |
| Q-panel | 5 | 2-3 | 0 |
| Bonder | 5 | 0 | 0 |

It can be seen that adhesion improvements are evident at both concentration regimes tested.

Preparation of Enamine Adducts EA1 and EA2

Added to a 100 ml round-bottomed flask were 4.0 g of 3-picolylamine and 14.1 g of TMP triacetoacetate (Lonzamon AATMP), along with a magnetic stirrer. The flask was then placed in a water bath to help keep the reaction at ambient conditions. A thermometer probe was also submerged in the reaction vessel to observe the temperature of the reaction. The contents were left stirring for 7-8 hours before adding 4.0 g of activated 4 Å molecular sieves to absorb the water produced as part of the equilibrium reaction. The flask was then left overnight and the contents were filtered. The resulting enamine product was analyzed by 1H NMR to verify the final product and validate the method. In a similar way enamine sample 2 was prepared, using 1-hexylamine.

| | EA1 | EA2 |
|---|---|---|
| 3-picolylamine (g) | 4.0 | — |
| 1-hexylamine (g) | — | 3.7 |
| TMPTAA (g) | 14.1 | 14.1 |
| Ethyl Acetate (g) | 4.8 | 4.7 |
| Mol. Sieves (g) | 4.0 | 4.0 |
| Total (g) | 26.9 | 26.6 |

Using the enamines prepared in this table, they were added to formulations as shown in the table below, and applied to different substrates to test for their influences on adhesion. The two formulations were sprayed onto both bonder and Q-panel substrates, and tested after 1 day of ambient drying. Coating formulations and adhesion results are given in the table below. They can be compared to comparative example CN1: example PEA1, containing the pyridine group clearly improves adhesion onto bonder and aluminium, whereas the reference enamine EA2 not containing this moiety, does not show this improvement at this concentration level.

| Code | CPEA1 | PEA1 |
|---|---|---|
| g MPE1 | 73.8 | 73.9 |
| g DTMPTA | 30.5 | 30.5 |
| g EA2 | 10.1 | |
| g EA1 | | 10.3 |
| g butylacetate | 6.6 | 6.6 |
| g n-propanol | 10.0 | 10.0 |
| g CAT4 | 5.6 | 5.6 |
| adhesion rating | | |
| Q-panel Al-46 | 5 | 0 |
| Gardobond 26 S 6800 OC | 5 | 0 |

Preparation of N-(2-Aminoethyl)-Ethyleneurea (AEEU), and its Enamine Adduct (EA3)

103.17 g (1 mole) of diethylenetriamine, 90.08 g (1 mole) of dimethylcarbonate and 630.24 g of xylene were charged to a reaction vessel and mixed at room temperature. The reaction vessel was fitted with a thermometer, a heating mantle and a distillation column/separator setup, in order to collect the methanol that is present and will be formed. On the reactor a dropping funnel was placed containing with the catalyst solution composed of 5.61 g (0.05 mole) of potassium tert-butoxide dissolved in 11.22 g methanol. During the complete reaction the reactor was kept under a blanket of nitrogen. The reaction was started by adding the above mentioned catalyst solution.

A slight exothermic effect was observed which increased the reaction temperature from 19° C. to 38° C. After 55 minutes the reaction temperature was increased to 90° C., and methanol was collected. The temperature of contents of the reactor was gradually increased and maintained at 133° C. till no methanol was liberated. The temperature of contents of the reactor was increased to 148° C. to remove most of the xylene. After cooling to 104° C. the catalyst, was neutralized with an equimolar amount of isononanoic acid. The contents of the reactor was cooled to 40° C. and the reaction product was poured into a separating funnel and washed with iso-octane. The resulting product was a yellowish very viscous wax at room temperature that slowly crystallized over time.

This product (AEEU) was combined with TMPTAA (TMP triacetoacetate) and ethylacetate as solvent, in a three-necked flask, and heated to 100° C. This was left for approximately 4 hours before being cooled to room temperature and then filtered. Ethylacetate was removed in vacuo.

|  | EA3 |
| --- | --- |
| AEEU (g) | 5.01 |
| TMPTAA (g) | 15.00 |
| ethyl acetate (g) | 5.32 |
| mol. sieves (g) | 4.0 |
| Total (g) | 29.3 |

The enamine formed (EA3) was formulated as a clear coating (PEA2), and sprayed onto a Gardobond 26S 6800 OC substrate. Adhesion testing was done after a 4 hr ambient+30 min 80 C drying time, and found to be very good (score 0).

|  | PEA2 |
| --- | --- |
| MPE1 (g) | 49.27 |
| DTMPTA (g) | 20.33 |
| EA3 (g) | 6.26 |
| n-propanol (g) | 3.70 |
| butyl acetate (g) | 4.24 |
| Catalyst CAT4 (g) | 6.34 |
| Total (g) | 90.14 |

Preparation of Adduct of 1,2,4-Triazole and DTMPTA (TD1)

The catalyst used in this synthesis was prepared as follows: a solution of tetrabutylammonium hydroxide in methanol is subjected to a solvent switch, by concentrating in a rotating film evaporator at 35° C. under reduced pressure, after adding propanol. Fresh propanol is added at various moments while removing methanol. The distillation is finished at a residual methanol content=4.5 wt % as confirmed by GC analysis. Next the solution is neutralized by bubbling gaseous $CO_2$ through the liquid via a glass inlet tube at room temperature. The reaction was judged to be finished when a water diluted sample indicates a pH of <8.5; final base content is 1.5 eq/kg solution as determined by potentiometric titration with 0.1 M HCl.

230 gram of a 15% 1,2,4-triazole solution in n-propanol (0.217 mole per 100 ml) was mixed at RT with 235 gram of DTMPTA and 5.0 gram of the catalyst solution described above. The reaction mixture was stirred at RT for 4 hours and monitored periodically with FTIR. No significant change in IR spectrum was observed after 3.5 hours reaction time. Then 40 grams of sodium hydrogencarbonate was added to the reaction mixture and stirred for 2 hours. The final product was obtained after filtration of the reaction mixture. After this, the mixture was vacuum distilled until no n-propanol was removed anymore. Acid value determination showed that no (acidic) free 1,2,4-triazole was left in this material. The resulting material contains triazole moieties added by an aza-Michael addition to acryloyl functional groups, as well as unreacted acryloyl groups.

Testing in a Paint Formulation

A pigment paste was made by milling a mixture of 117.6 g Miramer M4004 (Miwon), 240.5 g Kronos 2310 (Kronos BV), and 9.6 g Disperbyk-2150 (Altana). After finishing 10.1 g butylacetate was added and mixed. A paint was made by mixing the components listed in the below table. Catalyst CAT4 was added and stirred into the mixture in a level of 0.05 meq catalyst per g of total solid resins.

|  | CompTA | TA |
| --- | --- | --- |
| MPE1 (g) | 51.8 | 44.7 |
| Pigment paste (g) | 211.4 | 234.41 |
| DTMPTA (g) | 66.2 | 33.1 |
| TD1 (g) | 0 | 51.4 |
| TMPtriacetoacetate | 2 | 2 |
| succinimide | 0.83 | 0.92 |
| n-propanol | 25.2 | 28 |
| BYK3550 | 0.76 | 0.84 |
| catalyst CAT4 | 9.1 | 10 |
| crosshatch adhesion | 0% | 95% |

A coating was made by spraying the two paints (CompTA and TA) onto Gardobond 26S/60/OC (Chemetall) and curing at RT. Crosshatch adhesion was measured after 7 days. Paint TA containing the adduct TD1 showed good adhesion (95% crosshatch) whereas the reference paint (CompTA) did not (0% crosshatch).

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An RMA crosslinkable composition comprising:
   a. Crosslinkable components comprising reactive component A with at least two acidic protons C—H in activated methylene or methine groups (the RMA donor group),
   b. Crosslinkable components comprising reactive component B with at least two activated unsaturated groups (the RMA acceptor group),
   c. a catalyst C, capable of activating the RMA reaction between reactive component A and B,
   d. one or more adhesion promotors P comprising a moiety comprising one or more functional groups X reactable with reactive component A or reactive component B and a moiety comprising one or more functional groups Y that adsorb or react with the substrate surface not being an alkoxysilane group,
   wherein reactive component A is a malonate or an acetoacetate and reactive component B is an acryloyl and wherein the one or more functional groups X are reactable with malonate or acetoacetate and/or with acryloyl,
   wherein both functional groups X and Y are functional groups pending from a molecule,
   wherein the one or more functional groups X are selected from the group consisting of primary or secondary amine or moisture deblockable primary or secondary amine, thiol, isocyanate, epoxy, or RMA reactive components A' or B', optionally connected to the moiety comprising functional groups Y over a bridging group R,
   wherein the one or more functional groups Y comprise a nitrogen containing heterocyclic functional group or a polar functional group selected from the group consisting of alcohol, diol or moisture deblockable diol, triol amide and urea or substituted urea.

2. The RMA crosslinkable composition according to claim 1 wherein the weight amount of adhesion promotor P, in case of an adduct of an adhesion promotor P with said reactive components A' or B' not including the weight of reactive components A' or B', is between 0.1 and 10 wt. % relative to the total weight of the crosslinkable components.

3. The RMA crosslinkable composition according to claim 1 in the form of a kit of parts comprising two or more parts comprising one or more of the components A, B, C, wherein
   a. at least one part comprising catalyst C but not both A and B and preferably no A or B,
   b. at least one part not comprising catalyst C and one or more of components A, B, C or further coating additives,
   c. wherein one or more of the parts of the kit comprise one or more of the adhesion promotors P.

4. The RMA crosslinkable composition of claim 1, wherein the RMA crosslinkable composition comprises a crosslinkable component with component A being predominantly malonate.

5. The RMA crosslinkable composition of claim 1, wherein the one or more functional groups X are RMA reactive component A' or B' which are same or different from the RMA reactive components A and/or B in the crosslinkable components.

6. The RMA crosslinkable composition of claim 1, wherein the moisture deblockable primary or secondary amine is a ketimine, aldimine or oxazolidine.

7. The RMA crosslinkable composition of claim 1, wherein one or more functional groups Y are a nitrogen containing heterocyclic group selected from the group of pyridine, imidazole, cyclic amide, pyrrolidone, morpholine, triazole, benzotriazole or cyclic urea.

8. The RMA crosslinkable composition of claim 1, wherein one or more functional groups X are a polyfunctional reactive component B'.

9. The RMA crosslinkable composition of claim 8, wherein the adhesion promotor P is a reaction product of the polyfunctional reactive component B' and a nitrogen containing heterocyclic functional group, said reaction product comprising one or more reactive component B' as functional groups X and one or more heterocyclic functional group as functional group Y.

10. The RMA crosslinkable composition of claim 1, wherein the adhesion promotor P is a reaction product of a polyacryloyl, preferably a tri- or tetra-acryloyl with imidazole, triazole or benzotriazole.

11. The RMA crosslinkable composition of claim 1, wherein one or more functional groups X are a polyfunctional reactive component A'.

12. The RMA crosslinkable composition of claim 11, wherein the adhesion promotor P is a reaction product of an adhesion promoter P, wherein functional group X is an amine, and a polyfunctional acetoacetate, said reaction product comprising an acetoacetate group as functional group X bonded over an enamine bond to adhesion promoter P.

13. The RMA crosslinkable composition of claim 12, wherein the adhesion promotor P is the reaction product of polyfunctional acetoacetate, preferably trifunctional acetoacetate, with amino-methylpyridine.

14. The RMA crosslinkable composition of claim 1, wherein the adhesion promotor P comprises a ketal, acetal, orthoester or epoxy as the moisture deblockable diol functional group Y.

* * * * *